United States Patent
Park

(10) Patent No.: US 9,885,473 B2
(45) Date of Patent: Feb. 6, 2018

(54) GERMICIDAL HEATING APPARATUS USING SUPERHEATED VAPOR

(71) Applicant: Seung-Hee Park, Seoul (KR)

(72) Inventor: Seung-Hee Park, Seoul (KR)

(*) Notice: Subject to any disclaimer, the term of this patent is extended or adjusted under 35 U.S.C. 154(b) by 215 days.

(21) Appl. No.: 14/697,712

(22) Filed: Apr. 28, 2015

(65) Prior Publication Data

US 2015/0241053 A1   Aug. 27, 2015

Related U.S. Application Data

(63) Continuation of application No. PCT/KR2013/008989, filed on Oct. 8, 2013.

(30) Foreign Application Priority Data

Nov. 5, 2012 (KR) .................. 10-2012-0124160

(51) Int. Cl.
   *B01D 3/06* (2006.01)
   *F22B 1/28* (2006.01)
   (Continued)

(52) U.S. Cl.
   CPC .............. *F22B 1/287* (2013.01); *A01G 9/246* (2013.01); *F22B 1/282* (2013.01); *F22G 1/16* (2013.01); *F24H 3/08* (2013.01); *F24H 9/0063* (2013.01)

(58) Field of Classification Search
   CPC ......... A01G 9/246; F22B 1/282; F22B 1/287; F22G 1/16; F24H 3/08; F24H 9/0063
   (Continued)

(56) References Cited

U.S. PATENT DOCUMENTS 4,043,008 A * 8/1977 Weiss ............... D02G 1/161
                                        181/200
5,303,325 A * 4/1994 Pasternak ........... F24H 3/0405
                                        219/539
(Continued)

FOREIGN PATENT DOCUMENTS

CN     101749691    *  7/2010
EP       1918532    *  5/2008
(Continued)

OTHER PUBLICATIONS

Korean Office Action (KR 10-2012-0124160), KIPO, dated Jan. 16, 2013.
(Continued)

*Primary Examiner* — Dana Ross
*Assistant Examiner* — Joseph Iskra
(74) *Attorney, Agent, or Firm* — Park & Associates IP Law, P.C.

(57) ABSTRACT

A germicidal heating apparatus comprising a water supply part for supplying water, an superheated vapor generation part for generating superheated vapor by using the water supplied from the water supply part, and a blower for blowing the superheated vapor generated by the superheated vapor generation part through a discharge opening, characterized in that the superheated vapor generation part includes an annular vessel for receiving the water from the water supply part, and a spiral sheath heater arranged on the whole inside peripheral surface of the annular vessel, the upper end of the inside wall of the annular vessel being bent closely contacting the outside wall so as both to prevent leakage of the water contained in the annular vessel and to discharge the vapor generated by the heat of the sheath heater.

2 Claims, 1 Drawing Sheet

(51) Int. Cl.
*F24H 3/08* (2006.01)
*F24H 9/00* (2006.01)
*A01G 9/24* (2006.01)
*F22G 1/16* (2006.01)

(58) Field of Classification Search
USPC ........ 219/200, 385, 391, 401; 392/301, 386, 392/394, 399, 403
See application file for complete search history.

(56) References Cited

U.S. PATENT DOCUMENTS

| | | | |
|---|---|---|---|
| 6,647,204 B1* | 11/2003 | Hutchinson | A47L 11/34 15/320 |
| 2004/0050618 A1* | 3/2004 | Marocco | F01N 1/02 181/248 |

FOREIGN PATENT DOCUMENTS

| | | |
|---|---|---|
| JP | 2009-052847 A | 3/2009 |
| JP | 2010-078249 A | 4/2010 |
| JP | 2010078249 * | 4/2010 |
| KR | 10-2010-0004995 A | 1/2010 |
| KR | 10-0996836 B1 | 11/2010 |
| KR | 10-1255112 B1 | 4/2013 |

OTHER PUBLICATIONS

International Search Report (PCT/KR2013/008989), WIPO, dated Dec. 11, 2013.

* cited by examiner

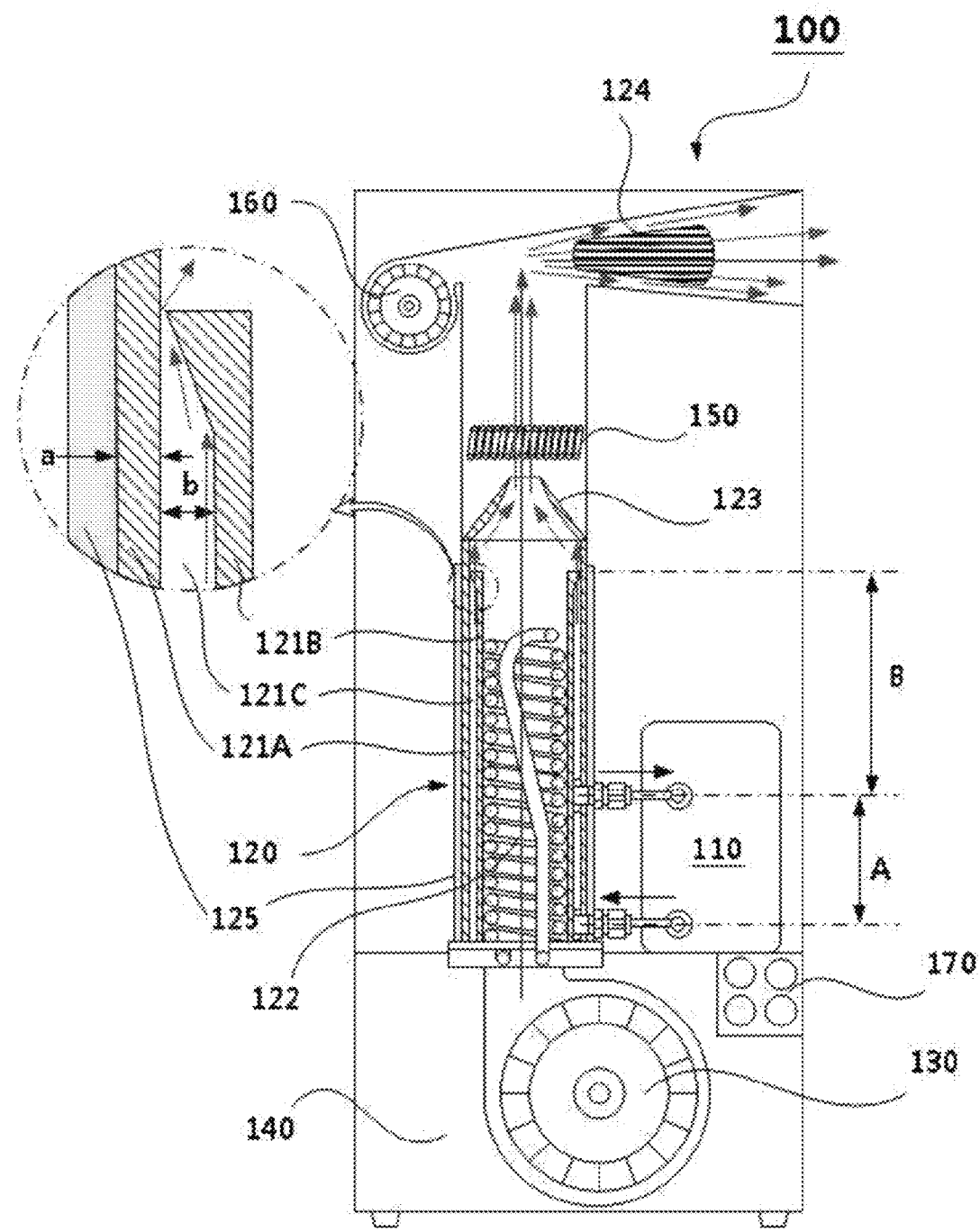

GERMICIDAL HEATING APPARATUS USING SUPERHEATED VAPOR

REFERENCE TO RELATED APPLICATIONS

This is a continuation of pending International Patent Application PCT/KR2013/008989 filed on Oct. 8, 2013, which designates the United States and claims priority of Korean Patent Application No. 10-2012-0124160 filed on Nov. 5, 2012, the entire contents of which are incorporated herein by reference.

FIELD OF THE INVENTION

The present invention relates to a heating apparatus or a hot air blowing apparatus and, more particularly, to a germicidal heating apparatus using superheated vapor in which air is sterilized while passing through a space of a sheath heater having the temperature of 600° C. or more and then is mixed with high temperature dry and pure vapor discharged from a cylindrical water vessel that is installed to cool the sheath heater, thereby producing aseptic greenhouse air good for organisms and causing an increase in indoor temperature owing to the vapor of high energy.

BACKGROUND OF THE INVENTION

In general, for example, a hot air fan heater or an oil fan heater is universally used as a conventional heating apparatus. The hot air fan heater includes a heater to heat air, a fan to blow the air heated in the heater, and a cabinet body configured to receive the heater and the fan therein. The hot air fan heater is adapted to heat an indoor space by heating air inside the cabinet body using the heater and, thereafter, exhausting the heated air from the cabinet body using the fan.

In addition, the oil fan heater includes a tank in which oil is stored, a burner to burn the oil supplied from the tank, a fan to blow air heated by the burner, and a cabinet body configured to receive the tank, the burner and the fan therein. The oil fan heater is adapted to heat an indoor space by exhausting the air heated by the burner from the cabinet body using the fan.

However, in the case of the conventional hot air fan heater, air is heated by the heater and additionally dried prior to being exhausted to an indoor space, which causes generation of dry indoor air. Moreover, the resulting dry hot air has a low thermal capacity and results in a poor heating efficiency. In addition, in the case of the oil fan heater, indoor ventilation is required since carbon dioxide is generated during burning of oil and, due to environmental load applied by carbon dioxide, there is a demand for a heating apparatus that causes substantially low environmental load in consideration of global warming.

SUMMARY OF THE INVENTION

Therefore, the present invention has been made in view of the above problems, and it is an object of the present invention to provide a heating apparatus or a hot air blowing apparatus and, more particularly, a germicidal heating apparatus using superheated vapor in which air is sterilized while passing through a space of a sheath heater having the temperature of 600° C. or more and then is mixed with high temperature dry and pure vapor discharged from a cylindrical water vessel that is installed to cool the sheath heater, thereby producing aseptic greenhouse air good for organisms and causing an increase in indoor temperature owing to the vapor of high energy.

In accordance with an aspect of the present invention, the above and other objects can be accomplished by the provision of a germicidal heating apparatus using superheated vapor, the apparatus including a water supply unit configured to supply water, a superheated vapor generation unit configured to generate superheated vapor using the water supplied from the water supply unit, and a blower configured to blow the superheated vapor generated in the superheated vapor generation unit through a discharge opening, the apparatus including an annular vessel constituting the superheated vapor generation unit, the annular vessel being configured to receive the water supplied from the water supply unit and provided at the entire inner peripheral surface thereof with a spiral sheath heater, and the annular vessel including an inner sidewall and an outer sidewall configured in such a manner that an upper end of the inner sidewall is bent so as to come into close contact with the outer sidewall in order to prevent leakage of the received water and to ensure discharge of vapor generated by heat of the sheath heater, a semi-opening type cover provided at an upper end of the annular vessel, the semi-opening type cover serving to secondarily prevent leakage of the water received in the annular vessel, an auxiliary fan and an auxiliary heater arranged in a vapor transfer path between the annular vessel and the discharge opening, the auxiliary fan and the auxiliary heater serving to control a temperature around the discharge opening so as to fall within a range of 100° C. to 150° C., a noise reduction device located in the vapor transfer path between the annular vessel and the discharge opening in order to reduce noise having a negative effect on organisms in consideration of an air flow rate and air pressure of the blower, the noise reduction device having a V-shaped or I-shaped cross section to maximize a sound absorption area, and a plurality of ceramic members arranged at the exterior of the annular vessel to achieve minimized heat loss and maximized usage of vapor and to prevent superheating inside the apparatus.

With a heating apparatus or a hot air blowing apparatus as proposed in an embodiment, as air is sterilized while passing through a space of a sheath heater having the temperature of 600° C. or more and then is mixed with high temperature dry and pure vapor discharged from a cylindrical water vessel that is installed to cool the sheath heater, there are effects of producing aseptic greenhouse air good for organisms and causing an increase in indoor temperature owing to the vapor of high energy.

In addition, the resulting high temperature dry vapor, i.e. superheated vapor tends to emit far infrared heat and anions. Far infrared heat is good for growth and anions have sterilization and deodorization functions as known. In addition, when an indoor temperature is set to about 22 degrees, the superheated vapor may maintain an indoor humidity at about 45%, which efficiently prevents respiratory diseases, xeroderma, fatigue and stress, thus having an advantageous effect on organisms.

BRIEF DESCRIPTION OF THE DRAWINGS

FIG. 1 is an exemplary sectional view illustrating a configuration of a germicidal heating apparatus using superheated vapor according to the present invention.

DETAILED DESCRIPTION OF THE INVENTION

Hereinafter, a germicidal heating apparatus using superheated vapor according to the present invention will be described in detail with reference to the annexed drawing.

The annexed FIG. 1 is an exemplary sectional view illustrating a configuration of a germicidal heating apparatus using superheated vapor according to the present invention. The germicidal heating apparatus using superheated vapor according to the present invention, designated by reference numeral 100, includes a water supply unit 110 to supply water, a superheated vapor generation unit 120 to generate superheated vapor using the water supplied from the water supply unit 110, and a blower 130 to blow the superheated air generated in the superheated vapor generation unit 120 through a discharge opening.

At this time, the superheated vapor generation unit 120 includes an annular vessel 121 to receive the water from the water supply unit 110 and a spiral sheath heater 122 formed at the entire inner peripheral surface of the annular vessel 121. To prevent leakage of the water received in the annular vessel 121 and to ensure discharge of the vapor generated by heat of the sheath heater 122, an upper end of an inner sidewall 121B of the annular vessel has a bent or protruding portion so as to come into close contact with an outer sidewall 121A.

Accordingly, the upper end of the inner sidewall 121B and the outer sidewall 121A of the annular vessel define a nozzle for discharge of the vapor.

In the configuration as described above, note that reference numeral 121 is a common reference numeral designating reference numerals 121A to 121C of FIG. 1 and is not actually written in the drawing.

In addition to the above-described configuration, the germicidal heating apparatus further includes a cabinet body 140 to receive the aforementioned components therein. The cabinet body is configured in such a manner that the discharge opening (not designated by reference numeral) of the cabinet body 140 is in communication with the superheated vapor generation unit 120 through a duct (not designated by reference numeral) to cause the superheated vapor generated in the superheated vapor generation unit 120 to be exhausted to an indoor space through the discharge opening via operation of the blower 130.

In addition, a semi-opening type cover 123 is installed to an upper end of the annular vessel 121 and serves to secondarily prevent leakage of the water received in the annular vessel 121. An auxiliary fan 160 and an auxiliary heater 150 are further arranged in a vapor transfer path (duct) between the annular vessel 121 and the discharge opening and serve to ensure that a surrounding temperature of the discharge opening falls within a range of 100° C. to 150° C.

In addition, to reduce noise that may have a negative effect on organisms in consideration of the flow rate and pressure of the air blown by the blower 130, a noise reduction device 124 is further installed in the vapor transfer path (duct) between the annular vessel 121 and the discharge opening. The noise reduction device 124 has a V-shaped or I-shaped cross section to maximize a sound absorption area.

At this time, with regard to positions of a water inlet line and a drain line suitable for continuous flow of water between the annular vessel 121 and the water supply unit 110, as exemplarily illustrated in FIG. 1, assuming that a height from the water inlet line to the drain line is designated by reference character A and a height from the drain line to the upper end of the inner sidewall of the annular vessel 121 is designated by reference character B, a relationship between these parameters A and B may be represented by "A≤B".

In this way, in the germicidal heating apparatus using superheated vapor according to the present invention, as air from a predetermined space passes through the apparatus, the air is sterilized while passing through a space of the sheath heater 122 having the temperature of 600° C. or more and then is mixed with high temperature dry and pure vapor discharged from the annular vessel 121 that is installed to cool the sheath heater 122, thereby producing aseptic greenhouse air good for organisms and causing an increase in room temperature owing to the vapor of high energy.

In addition, although the annular vessel 121 needs to ensure smooth fluid flow through use of an open circular outlet hole formed at the top thereof in order to generate sanitized hot air and purified high temperature dry vapor, it may be necessary to control the fluid flow to achieve sufficient fluid heating. Accordingly, as illustrated in the enlarged view of important parts of FIG. 1, the upper end of the inner sidewall 121B of the annular vessel is formed with the bent or protruding portion so as to come into close contact with the outer sidewall 121A. In this way, the upper end of the inner sidewall 121B and the outer sidewall 121A of the annular vessel serve as a nozzle for discharge of the vapor.

The water stored in the water supply unit 110 may be directed to a water purifying device in order to minimize a hardening material that may prevent fluid flow. Therefore, a purifying/hydraulic pump device 17 including a water purifying device and a hydraulic motor may be installed upstream of a water supply line to ensure efficient supply of pure water required per unit time. The purifying device may be installed at the outside of the apparatus according to an installation position and may include one or more water purifying filters, for example, a primary filter, a secondary filter, an RO filter and a complex resin filter as well as a hydraulic motor according to the quality of supplied water. This configuration serves to minimize a hardening material, thereby preserving the lifespan of key components.

In addition, as can be expected, when the sheath heater 122 has a protruding configuration, it may be easily broken by external shock. Moreover, the sheath heater 122 may seem like a pillar of fire when viewed from the outside, thus stimulating children' curiosity. Therefore, the annular vessel 121 may be designed so as not to protrude outward.

In addition, an electric device (not illustrated), which is provided to ensure an efficient operation of the germicidal heating apparatus using superheated vapor according to the present invention, is configured to achieve a desired effect using water. Therefore, the electric device requires a printed circuit board (PCB) control device attached thereto in order to maximize safety and, in turn, the PCB requires functionality for automatic control of external shock, gradient, superheating, and temperature of air to be discharged.

In addition, assuming that a thickness of the inner sidewall 121B or the outer sidewall 121A of the annular vessel is designated by reference character "a" and a distance of a space 121C between the inner sidewall 121B and the outer sidewall 121A of the annular vessel is designated by reference character "b", a relationship between these parameters "a" and "b" may be "b≤a".

In addition, to achieve minimized heat loss as well as maximized usage of vapor and to prevent unwanted superheating inside the apparatus, at least one heat reserving member 125 formed of a ceramic material or other equivalent materials may be attached to the exterior of the annular vessel. At this time, a plurality of heat reserving members 125 may be aligned.

Although the preferred embodiment of the present invention has been disclosed for illustrative purposes, those skilled in the art will appreciate that various modifications, additions and substitutions are possible, without departing from the scope and spirit of the invention as disclosed in the accompanying claims and these modifications and variations should not be understood separately from the technical ideas or prospects of the present invention.

The present invention relates to a germicidal heating apparatus including a water supply unit configured to supply water, a superheated vapor generation unit configured to generate superheated vapor using the water supplied from the water supply unit, and a blower configured to blow the superheated vapor generated in the superheated vapor generation unit through a discharge opening. More particularly, the superheated vapor generation unit includes an annular vessel to receive the water supplied from the water supply unit and a spiral sheath heater provided at the entire inner peripheral surface of the annular vessel. An upper end of an inner sidewall of the annular vessel is bent so as to come into close contact with an outer sidewall in order to prevent leakage of the received water and to ensure discharge of vapor generated by heat of the sheath heater. Through provision of the germicidal heating apparatus using superheated vapor, air is sterilized while passing through a space of the sheath heater having the temperature of 600° C. or more and then is mixed with high temperature dry and pure vapor discharged from a cylindrical water vessel that is installed to cool the sheath heater, thereby producing aseptic greenhouse air good for organisms and causing an increase in indoor temperature owing to the vapor of high energy. Accordingly, the present invention has industrial availability in the fields of a heating apparatus.

What is claimed is:

1. A germicidal heating apparatus using superheated vapor, the apparatus comprising a water supply unit configured to supply water, a superheated vapor generation unit configured to generate superheated vapor using the water supplied from the water supply unit, and a blower configured to blow the superheated vapor generated in the superheated vapor generation unit through a discharge opening, the apparatus comprising:

an annular vessel constituting the superheated vapor generation unit, the annular vessel having an annular inner space for receiving the water supplied from the water supply unit and provided at the entire inner peripheral surface thereof with a sheath heater, and the annular vessel including an inner sidewall and an outer sidewall, an upper end of the inner sidewall having a bent or protruding portion protruded toward the outer sidewall so as to come into close contact with the outer sidewall in order to prevent leakage of the received water and to ensure discharge of vapor generated by heat of the sheath heater;

a partly opened cover provided at an upper end of the annular vessel, the partly opened cover serving to secondarily prevent leakage of the water received in the annular vessel;

an auxiliary fan and an auxiliary heater arranged in a vapor transfer path between the annular vessel and the discharge opening, the auxiliary fan and the auxiliary heater serving to control a temperature around the discharge opening so as to fall within a range of 100° C. to 150° C.;

a noise reduction device located in the vapor transfer path between the annular vessel and the discharge opening in order to reduce noise having a negative effect on organisms in consideration of an air flow rate and air pressure of the blower; and a plurality of ceramic members arranged at the exterior of the annular vessel to achieve minimized heat loss and maximized usage of vapor and to prevent superheating inside the apparatus, wherein the water supply unit is connected to the annular vessel via a water inlet line and a drain line for providing continuous water flow between the water supply unit and the annular vessel, wherein positioning of the water inlet line and the drain line with respect to the annular vessel is defined such that a height (A) from the water inlet line to the drain line is the same or smaller than a height (B) from the drain line to the upper end of the inner sidewall of the annular vessel.

2. The germicidal heating apparatus of claim 1, wherein the noise reduction device has a generally trapezoidal cross-sectional shape to maximize a sound absorption area in the vapor transfer path.

* * * * *